United States Patent [19]

Conover

[11] Patent Number: 5,679,390
[45] Date of Patent: Oct. 21, 1997

[54] COMPOSITION AND METHOD FOR MAKING/USING A NATURAL FAT-FREE, DEEP-FRIED FLAVORING

[76] Inventor: Donald Robert Conover, 4247 Bloomington Ln., Arlington Hts., Ill. 60004

[21] Appl. No.: 508,265

[22] Filed: Jul. 27, 1995

[51] Int. Cl.$^6$ .................................................. A23L 1/22
[52] U.S. Cl. ............................. 426/96; 426/289; 426/650
[58] Field of Search .................................. 426/96, 289, 650, 426/651

[56] References Cited

U.S. PATENT DOCUMENTS

| | | | |
|---|---|---|---|
| 3,769,038 | 10/1973 | Mitchell | 426/651 |
| 3,908,026 | 9/1975 | Neely | 426/538 |
| 4,915,962 | 4/1990 | Howard | 426/74 |
| 5,149,552 | 9/1992 | Vidal | 426/321 |
| 5,268,186 | 12/1993 | Moskowitz | 426/627 |
| 5,506,353 | 4/1996 | Subramaniam | 426/650 |
| 5,525,367 | 6/1996 | King | 426/533 |

*Primary Examiner*—Carolyn Paden
*Attorney, Agent, or Firm*—Hill, Steadman & Simpson

[57] ABSTRACT

The present invention provides a method and a natural flavoring composition for imparting a deep-fried flavor to foods without added fat. Additionally, the present invention provides a method of making the flavoring composition. To this end, a fatty acid starch component and anti-caking agent is provided. In an embodiment, a fatty acid component is provided, comprising approximately 10% by weight of the total composition. The fatty acid component includes caprylic, capric, lauric, myristic, palmitic and stearic acids. An anti-caking agent, preferably silicon dioxide, comprising 3.75% by weight of the total composition is provided; and a starch component, preferably maltodextrin, comprising 86.25% by weight of the total composition is provided.

20 Claims, No Drawings

COMPOSITION AND METHOD FOR MAKING/USING A NATURAL FAT-FREE, DEEP-FRIED FLAVORING

BACKGROUND OF THE INVENTION

The present invention relates generally to compositions and methods for food modification, more particularly it relates to methods and all natural compositions for imparting deep-fried flavor during the cooking process without the addition of fat.

Dietary fat contributes positively and negatively to the health and well-being of modern humans. While it is well known as an energy source and precursor of body tissues, it is implicated as a risk factor in atherogenesis and cancers of the colon, breast and uterus. A number of dietary goals were developed by the Senate Select Committee on Nutrition and Human Needs in 1977 in response to public hearings on diet and health. Three goals related to fat intake, with emphasis on reduced overall consumption of fat, reduced saturated fat and reduced dietary cholesterol.

The typical American diet is high in fat. Recent assessments support the view that people in the United States obtain approximately 40–45% of their calories from fat. A significant component of the American diet is hydrogenated oil products that are used in the form of cooking oil, margarine and shortening. It is interesting to note that in American culture, foods with fats have been symbols of pleasure, affluence and status. For example, desserts made with whipped cream are viewed as special treats. Fried foods are also very popular menu items.

Today people are advised to reduce saturated fats, but their liking for fried foods and other foods of high fat content makes it difficult to satisfactorily institute this proposed diet of less saturated fat. Fat is taste. Attitudes, however, are changing according to recent surveys. Popular press about the possible hazards associated with excess fats in the diet have provoked much greater attention to the composition of food consumed by Americans. A variety of special low-fat and fat-modified products have appeared on the market and many are gaining widespread popularity.

The Food Marketing Institute report (The 1986 edition of the Food Marketing Institute's *Trends: Consumer Attitudes—The Supermarket*) indicated that nearly three-fourths of the survey population was concerned about food ingredients when eating out. Two Gallup surveys, conducted for the National Restaurant Association in 1983 and 1986, concluded that consumers are changing their eating habits "by increasing their consumption of fruits, vegetables, or whole grains or by decreasing their consumption of refined sugar, animal fats, or salt." They revealed that 6 out of 10 consumers reported altering their at-home eating habits and 4 out of 10 were changing their away-from-home choices. The responses were very similar during both survey years, indicating that concern about nutrition has remained a strong influence and is not merely a passing fad.

The consumers surveyed for the National Restaurant Association stated that when dining in restaurants they were using less salt or no salt (23 percent), using less fat (20 percent), and avoiding fried foods (15 percent). Thus, despite the increasing public awareness regarding the negative nutritional implications of consuming fried-foods, only a small number of the consumers surveyed were avoiding fried foods.

A Nielson report on consumer behavior cited three top motivators in the purchase of food items: taste, price, and healthfulness, with the order dependent on the circumstances (Carlson, 1983). It also estimated that about three-fourths of consumers were considering nutrition in their food purchasing decisions but that they would not buy a product more than once if the taste was not acceptable, even if it was cheaper and more healthful. Others have suggested that convenient preparation is the dominant theme among today's new products, with nutrition replacing price as the key consideration in many food purchase decisions. (PF New Products Annual, 1986a).

Dietary guidelines for Americans (USDA and USDHHS, 1985) suggest reducing fat and cholesterol in diets. The American Heart Association suggests limiting fat consumption to less than 30% of calories. The basis for these proposed modifications largely derives from extensive research on dietary fat, blood lipids and atherosclerosis.

Within the past 85 years, however, the fat consumption in the United States has increased. Restaurant use of fats and oils increased 69 percent between 1969 and 1979, primarily because of the increase in the number of fast-food restaurants and other establishments serving fried foods like chicken, fish, and french fried potatoes (Bunch and Hazera, 1984). Although there is little information on changes since 1979, restaurant use of edible tallow for frying is primarily responsible for the increased use of animal fats since 1980.

In 1985, butter, lard, and tallow accounted for 20 percent of the total use of fats and oils. About 4 pounds of lard and tallow per capital were used directly, either by restaurants or consumers.

This increase in fat consumption has been paralleled by an increase in cardiovascular disease. Concern has been expressed over methods that can be developed to modify American food habits, but this is not an easy task. One approach is to make readily available commonly used food products that contain lower amounts of fat.

In 1989, approximately 626 products bearing health claims relating to reduced/low fat items were available according to the "New Product News" source. Originally, many fat-reduced products were terrible in taste. Manufacturers rushed out with products that lacked taste or texture. These products required consumers to make an exceptional taste sacrifice for their purchase. In 1994, 1439 products bore reduced/low fat health claims. However, no product exists, heretofore, that imparts a deep-fat fried flavor to traditionally fried foods such as meats, fish and vegetables without adding fat. Many new food products are continually developed and marketed that focus on reducing available fat, but many more still need to be developed. Although in the past, public health significance of fat-modified foods has been limited, there exists a growing demand for such products today.

It is therefore, an object of the present invention to provide a fat-free composition and method for flavoring foods with a flavor and taste sensation comparable to the flavor imparted by a deep-fat frying method.

To make products more acceptable to health-conscious consumers, fat content should be reduced while minimizing changes in product palatability. Products of this sort can be used along with other recommended dietary modifications to ultimately improve overall dietary composition and still provide menus acceptable to a wide variety of people.

It is a further object of the present invention to provide a composition that is entirely fat-free as well as being made of natural ingredients.

The inventors of the present invention have surprisingly discovered a composition and method designed for health-conscious consumers who desire lower-fat foods that deliver the taste of deep-fat frying without the grams of fat inherent in foods prepared in the traditional manner of deep-fat frying.

SUMMARY OF THE INVENTION

The present invention provides a composition and method for making and using fat-free, deep-fried flavoring for use in food preparation. The composition of the present invention can be used as an additive to a seasoning coating base such as the commercially available Shake-N-Bake® or one otherwise prepared for use in the preparation of meats, fish or vegetables as well as other foods.

The composition of the present invention comprises, in the overall concept, a modified starch which is mixed with a solid mixture of cooled melted fatty acids and an anti-caking agent.

The flavoring composition includes a fatty acid component including at least one $C_8$–$C_{18}$ fatty acid, an anti-caking agent, and a starch component.

In an embodiment, the anti-caking agent is silicon dioxide. In an alternative embodiment, the silicon dioxide is in the amount of approximately 3.75 percent by weight of the total flavoring composition.

In an embodiment, the starch component is maltodextrin. In an alternative embodiment, the maltodextrin is in the amount of approximately 86.25 percent by weight of the total flavoring composition.

Moreover, the present invention provides a method for the preparation of a flavoring composition including the steps of preparing a fatty acid mixture with a starch component and adding an anti-caking agent to the fatty acid mixture containing the starch component.

A method for preparation of a flavoring composition is provided in the present invention. The method includes the step of forming a fatty acid component having a mixture of fatty acids including caprylic, capric, lauric, myristic, palmitic and stearic acids. The mixture of fatty acids is heated to a melting temperature so that all of the fatty acids melt. The fatty acid mixture is blended thoroughly and allowed to cool to a room temperature. The fatty acid mixture is reheated at the melting temperature. An appropriate amount of a silicon dioxide component is then added. The fatty acid mixture containing an amount of the silicon dioxide component is allowed to stand for at least approximately 24 hours. Finally, the fatty acid mixture containing an amount of the silicon dioxide component is mixed with an amount of a maltodextrin component.

The present invention further provides a method of imparting a deep-fried flavor to foods without the addition of fat. The method includes the steps of preparing a flavorant; combining the flavorant with a seasoning coating base to form a seasoning coating; and applying the seasoning coating to a foodstuff prior to baking.

In an embodiment, the foodstuff is selected from meat, fish, poultry and vegetables.

Furthermore, the present invention provides a method of imparting a deep-fried flavor to foods without the addition of fat. The method includes the steps of preparing a deep-fried flavoring composition containing a mixture of fatty acids including caprylic, capric, lauric, palmitic, myristic and stearic acids; silicon dioxide; and a maltodextrin. Maltodextrin is then added to the deep-fried flavoring composition. The deep-fried flavoring containing an amount of maltodextrin is added to a seasoning coating base in dry state to form a seasoning coating. The seasoning coating containing the deep-fried flavoring composition is applied to a food prior to preparation. The coated food is then baked.

Further, the present invention provides a seasoning coating for imparting deep-fried flavor. The seasoning coating includes a seasoning coating base which has at least one component chosen from the group consisting of bread, flour, cereal, grain and a flavorant additive, which includes a mixture of fatty acids, a starch component and an anti-caking agent.

A method for making a seasoning coating is provided. The method includes preparing a seasoning coating base which includes at least one member selected from the group consisting of bread, flour, cereal and grain. A deep-fried flavoring is prepared which includes a major proportion of a starch component, a minor proportion of a fatty acids component, and a minor proportion of an anti-caking agent. The deep-fried flavoring is then combined with a maltodextrin. The deep-fried flavoring is added to the seasoning coating base.

In another embodiment, the major proportion of a starch component in the deep-fried flavoring is approximately 86.25% by weight of the total deep-fried flavoring composition.

In an embodiment, the seasoning coating base is in an amount of approximately 98% by weight of the total seasoning coating and the deep-fried flavoring is in an amount of approximately 2% by weight of the total seasoning coating.

In another embodiment, the minor proportion of an anti-caking agent is approximately 3.75% by weight of the total deep-fried flavoring.

An advantage of the present invention is that it provides a fat-free flavoring composition that imparts a flavor and taste sensation equivalent to the flavor imparted by deep-fat frying.

Still further, an advantage of the present invention is that it can be used as an additive to seasoning coatings commercially or otherwise available to be used in preparing poultry, fish, vegetables and other foods.

Another advantage of the present invention is that it provides a composition and method for use during conventional oven baking.

Another advantage of the present invention is that it provides a composition and method for use during microwave cooking.

Another advantage of the present invention is that it enhances the seasoning flavor by releasing its ingredients more effectively.

Another advantage of the present invention is that it imparts a very pleasant "feel" on the back of the tongue even though it is fat-free, due to the high molecular weight of the composition.

Still further, an advantage of the present invention is that it aids persons on fat and/or calorie controlled diets by allowing more palatable foods to be consumed while on such diet regimens.

Another advantage of the present invention is to help improve overall dietary composition and fat intake of persons according to United States government recommended dietary modifications for Americans.

DETAILED DESCRIPTION OF THE PRESENTLY PREFERRED EMBODIMENTS

The present invention provides a flavoring composition for use in the preparation of foods. The composition, however, does not add fat to such foods prepared pursuant to the present invention. The present invention also provides a method for making the flavoring composition and a method for using the flavoring composition in food preparation.

The flavoring composition of the present invention is of a high molecular weight which contributes to imparting a pleasant "feel" on the back of the tongue, similar to the sensation experienced when consuming foods of high fat content.

Maltodextrins are a solution or dried material of saccharides obtained from starch. Typically, the composition of maltodextrins is as follows: approximately 65–80% high saccharides; 4–9% pentasaccharides; 4–7% tetrasaccharides; 5–9% trisaccharides; trace mono- and disaccharides. Maltodextrins are available in dextrose equivalents of 5, 10–14, and 15–19. Maltodextrins are used as bulking agent or to increase viscosity without adding sweetness. Maltol and dextrin are used as flavor enhancers and texture modifiers.

Maltodextrins are available as spray-dried powders, in agglomerated form, and as products with an even lower bulk density and even larger surface area. They have the ability to absorb flavor oils and other nonaqueous liquids. Their flowability, compressibility and low hygroscopicity make them excellent excipients. They provide moderate to very low solution viscosity, and low to extremely low browning. They are generally bland and resist caking. They form protective films with oxygen barrier properties and provide binding, surface sheen and high solids content without affecting freezing points.

Especially prepared, low dextrose equivalency, more crystalline maltodextrins produce a fatty mouth feel. Maltodextrins are most often made from potatoes or tapioca starch. Oat flour, rice flour, and bran are other sources used for their preparation. Maltodextrins, when hydrated, form soft, spoonable gels with a creamy texture. They generally have dextrose equivalency values less than three. Maltodextrins are also used as carriers for fatty acids.

Maltodextrins are also excellent flavor carriers and dispersants for instant dry mixes. They provide uniform coatings, bind, and function as a carrier for flavors, spices and seasonings.

The more crystalline maltodextrins are effective fat sparers and replacers in low-fat or non-fat dairy products such as: ice milks, frozen yogurt, frozen desserts, dips, margarine spreads, cheese-type spreads, creamy dressings, spoonable dressings, and baked goods, including frostings and fillings. They have an energy value of about 3–8 kcal $g^{-1}$ as compared to about 9 kcal $g^{-1}$ for a fat or oil.

Some food products, particularly those that contain one or more hygroscopic substances, require the addition of an anti-caking agent to inhibit formation of aggregates and lumps and thus retain the free-flowing characteristic of the products.

A number of anti-caking substances listed below are commonly used anti-caking additives:

| | |
|---|---|
| Calcium carbonate | Magnesium stearate |
| Calcium phosphate | Myristates |
| Calcium silicate | Palmitates |
| Calcium stearate | Phosphates (Calcium tribasic |
| Cellulose, microcrystalline | magnesium tribasic, sodium |
| Cellulose, powdered | di- and tetrasodium) |

-continued

| | |
|---|---|
| Kaolin | Silicon dioxide |
| Magnesium carbonate | Sodium ferrocyanide |
| Magnesium hydroxide | Sodium silicoaluminate |
| Magnesium oxide | Starches |
| Magnesium silicate | |

The very high adsorption properties of the anti-caking substance removes moisture that can cause fusion. Many anti-caking agents, including silicon dioxide, otherwise known as silica gel or hydrated silica, also act as dispersants for powered products.

By way of example, and not limitation, an example of a suitable composition of the present invention will now be given.

EXAMPLE

A suitable flavoring composition is one comprising a mixture of caprylic, capric, lauric, myristic, palmitic and stearic acids; syloid; and maltodextrin. Such a composition may consist of the following ingredients in the stated proportions:

| Flavoring Composition Ingredients | Weight Percent Of the Total Composition |
|---|---|
| caprylic acid | .40 |
| capric acid | .40 |
| lauric acid | 1.20 |
| myristic acid | 1.60 |
| palmitic acid | 4.00 |
| stearic acid | 2.40 |
| syloid | 3.75 |
| maltodextrin | 86.25 |
| Total | 100.00 |

The flavoring composition is prepared as follows. The first six ingredients above, which are $C_8$–$C_{18}$ fatty acids, are combined and heated to 50° C., at which temperature they all will melt. The fatty acids are thoroughly blended together. The mixture of melted fatty adds is permitted to cool to room temperature.

After cooling, the fatty acid mixture is heated again to the melting stage, at which time Syloid (silicon dioxide) is added. After cooling a second time, the fatty acid mixture and Syloid, is allowed to stand, undisturbed, for a minimum of 24 hours.

After the mixture stands for a minimum of 24 hours, it is then blended with the maltodextrin in the quantity listed below, using a ribbon blender.

| Ingredient | Weight Percent Of the Total Composition |
|---|---|
| Flavoring composition | 10.0 |
| Maltodextrin | 90.0 |
| Total | 100.00 |

After the flavoring composition is blended with the maltodextrin, the flavoring composition is then added to any seasoning coating base, e.g. Shake-N-Bake®, in an amount of 2% by weight, forming a seasoning coating. Both the flavoring composition and the seasoning coating base are mixed in the dry state.

Prior to cooking, the seasoning coating containing the flavoring composition is applied to poultry, fish, meat, vegetables or any other suitable foodstuff. The coated food is then baked for approximately 55 minutes at 350 degrees Fahrenheit or microwaved at the recommended equivalent time and temperature setting.

By using the flavoring composition in this manner, the food will have a "deep-fried" flavor. The high molecular weight of the flavoring composition imparts a very pleasant "feel" on the back of the tongue, despite the fact that the flavoring composition is "fat-free".

Additionally, the seasoning coating flavor is enhanced by adding the flavoring composition to the seasoning coating base. The flavoring composition causes the ingredients to be released more effectively.

It should be understood that various changes and modifications to the presently preferred embodiments described herein will be apparent to those skilled in the art. Such changes and modifications can remain without departing from the spirit and scope of the present invention and without diminishing its intended advantages. It is therefore intended that such changes and modifications be covered by the appended claims.

I claim:

1. A fat-free flavoring composition for simulating a deep-fried flavoring and for providing a simulated deep-fried coating for food without adding fat calories to the food, the composition comprising:

a fatty acid component including at least one $C_8$–$C_{18}$ fatty acid;

an anti-caking amount of an anti-caking agent comprising silicon dioxide; and a starch component comprising maltodextrin.

2. The flavoring composition of claim 1 wherein the fatty acid component is as follows:

| Fatty Acids | Weight Percent |
| --- | --- |
| caprylic | .40 |
| capric | .40 |
| lauric | 1.26 |
| myristic | 1.60 |
| palmitic | 4.00 |
| stearic | 2.40, | based upon the total weight of the flavoring composition.

3. The flavoring composition of claim 1 wherein the anti-caking agent further comprises an agent selected from the group comprising calcium carbonate, calcium phosphate, calcium silicate, calcium stearate, cellulose, kaolin, magnesium carbonate, magnesium hydroxide, magnesium oxide, magnesium silicate, magnesium stearate, myristates, phosphates, sodium ferrocyanide and sodium silioaluminate.

4. The flavoring composition of claim 1 wherein the silicon dioxide is present in the amount of approximately 3.75 percent by weight of the total flavoring composition.

5. The flavoring composition of claim 1 wherein the composition contains maltodextrin in the amount of approximately 86.25 percent by weight of the total flavoring composition.

6. A method for preparing a flavoring composition comprising the steps of:

preparing a fatty acids mixture;

combining the fatty acids mixture with an anti-caking agent comprising silicon dioxide;

combining the fatty acids and silicon dioxide mixture with a first amount of starch component comprising maltodextrin; and adding a second amount of starch component comprising maltodextrin to the fatty acids, silicon dioxide and maltodextrin mixture to provide a flavoring composition.

7. A method for the preparation of a flavoring composition comprising the steps of:

forming a fatty acid component comprising a mixture of fatty acids including caprylic acid, capric acid, lauric acid, myristic acid, palmitic acid, stearic acid;

heating the fatty acid component to a melting temperature until said fatty acids melt;

blending thoroughly the melted fatty acid component;

cooling the fatty acid component to a room temperature;

reheating the fatty acid component to the melting temperature;

adding the silicon dioxide component;

cooling the fatty acid component containing the silicon dioxide component;

allowing the fatty acid component containing the silicon dioxide component to stand for at least approximately 24 hours; and remixing the fatty acid component containing the silicon dioxide component with a maltodextrin component.

8. The method of claim 7 wherein the appropriate balance of acids in the acid phase is as follows:

| Fatty Acids | Weight Percent |
| --- | --- |
| caprylic | .40 |
| capric | .40 |
| lauric | 1.20 |
| myristic | 1.60 |
| palmitic | 4.00 |
| stearic | 2.40, | based upon the total weight of the flavoring composition.

9. The method of claim 7 wherein the silicon dioxide component is in an amount of approximately 3.75% by weight of the flavoring composition.

10. The method of claim 7 wherein the maltodextrin component is in an amount of approximately 86.25% by weight of the flavoring composition.

11. A method for imparting a deep-fried flavoring to a foodstuff during food preparation without the addition of fat, comprising the steps of:

preparing a flavorant;

combining the flavorant with a seasoning coating base to form a seasoning coating; and applying the seasoning coating to a foodstuff prior to baking.

12. The method according to claim 11 wherein the foodstuff is selected from meat, fish, poultry and vegetables.

13. A method of imparting a deep-fried flavor to foods without the addition of fat, comprising the steps of:

preparing a deep-fried flavoring composition containing a mixture of fatty acids including caprylic, lauric, myristic, palmitic, capric and stearic acids, silicon dioxide, and a first amount of maltodextrin;

adding a second amount of maltodextrin to the deep-fried flavoring composition;

adding the deep-fried flavoring composition containing the second amount of maltodextrin to a seasoning coating base in a dry state to form a seasoning coating;

applying the seasoning coating containing the deep-fried flavoring composition to a food prior to preparation; and baking the coated food.

14. A fat-free seasoning coating for imparting deep-fried flavor and for providing a simulated deep-fried coating for food without adding fat calories to the food, the coating comprising:
- a seasoning coating base, the seasoning coating base including at least one member selected from the group consisting of: breads, flour, cereal and grain; and
- a flavorant additive, the flavorant additive including a mixture of $C_8$–$C_{18}$ fatty acids, a starch component comprising maltodextrin and an anti-caking agent comprising silicon dioxide.

15. The fat-free seasoning coating of claim 14 wherein the $C_8$–$C_{18}$ fatty acids comprise:

| Fatty Acids | Weight Percent |
|---|---|
| caprylic | .40 |
| capric | .40 |
| lauric | 1.20 |
| myristic | 1.60 |
| palmitic | 4.00 |
| stearic | 2.40, | based upon the total weight of the flavorant additive.

16. A method for making a seasoning coating, the method comprising the steps of:
- preparing a seasoning coating base, the seasoning coating base including at least one member selected from the group comprising of: corn, flour, cereal, grain, and bread;
- preparing a deep-fried flavoring, the flavoring including a major proportion of a starch component, a minor proportion of a fatty acids component, and a minor proportion of an anti-caking agent;
- combining the deep-fried flavoring with a maltodextrin; and
- adding the deep-fried flavoring to the seasoning coating base.

17. The method of claim 16 wherein the seasoning coating base is in an amount of approximately 98% by weight of the total seasoning coating and the deep-fried flavoring is in an amount of approximately 2% by weight of the total seasoning coating.

18. The method of claim 16 wherein the major proportion of a starch component in the deep-fried flavoring is approximately 86.25% by weight of the total seasoning coating.

19. The method of claim 16 wherein the minor proportion of an anti-caking agent is approximately 3.75% by weight of the total flavoring.

20. The method of claim 16 wherein the minor proportion of an acid component includes the following:

| Fatty Acids | Weight Percent |
|---|---|
| caprylic | .40 |
| capric | .40 |
| lauric | 1.20 |
| myristic | 1.60 |
| palmitic | 4.00 |
| stearic | 2.40, | based upon the total weight of the flavoring composition.

* * * * *